ethylene polymerization plant for several months without process shut down attributable to catalyst poisoning.

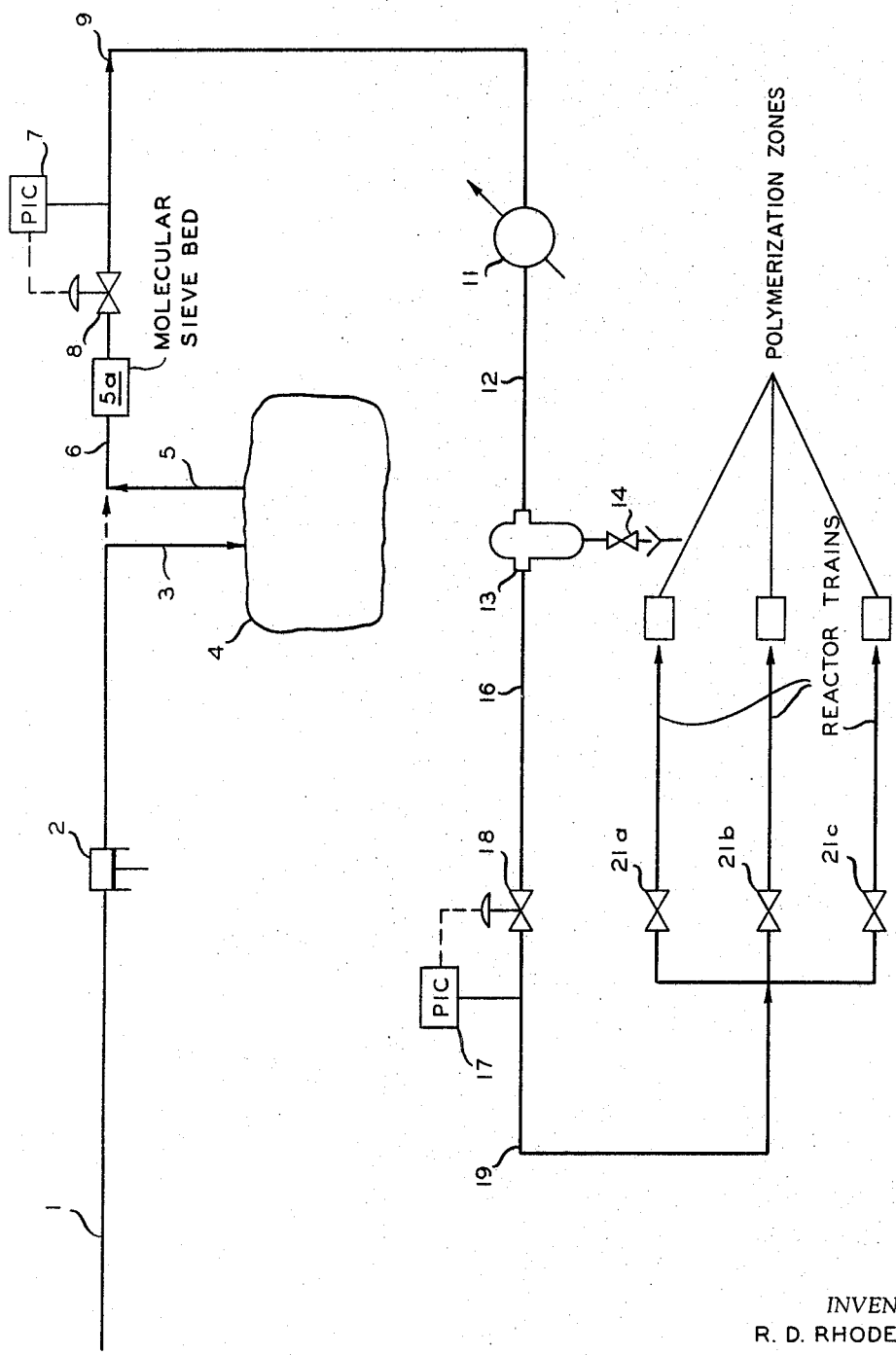

Among the normally gaseous olefins to which the present invention may be applied are ethylene, propylene, and butenes. All of these are produced in large tonnages and require large storage capacities to even out differences between production and consumption. They further require high purity to be suitable for use in such sensitive reactions as polymerization.

Referring now to the drawing, in regard to which the invention will be described in further detail, as to a preferred embodiment, a stream of ethylene from a purification step (not shown) is passed via conduit 1 to a compressor 2, wherein the ethylene pressure is raised to about 1100 p.s.i.g. The compressed ethylene is passed to storage over brine via conduit 3 in underground storage 4. Ethylene, as required, is withdrawn via conduit 5 from cavern 3, is directed through a molecular sieve bed 5a, and passes to a first pressure control station, comprising pressure indicator controller 7 and motorized pressure let-down valve 8. The stream of ethylene enters the pressure let-down zone typically at 850 to 1050 p.s.i.g., 70° F. and ethylene density ranging from 10 to 18 lb./ft.$^3$. The stream 9 exits valve 8, typically at 600 p.s.i.g., 40° F.

The refrigeration effect, described by Joule-Thompson, which occurs when substantially reducing the pressure on a high pressure normally gaseous stream, is frequently strong enough to cause partial liquefaction of the stream. In order to overcome this refrigeration effect for purposes of accurate flow measurements, and achieving the desired stream density, a heater 11 is preferably disposed in stream 9. It may conveniently be of the shell and tube type. The heated ethylene 12 exits heater 11, typically at 600 p.s.i.g., 100° F., and density about 3.8 lb./ft.$^3$. The density change attributable to this heating step is deemed significant in the subsequent effective removal of oil.

The oil separation means 13 of this invention is positioned in stream 12 for effective removal of entrained oil and catalyst poisons from the ethylene. A suitable oil coalescer for this purpose is the V. D. Anderson Mist Extractor Type L, a division of the International Basic Economy Corp., Cleveland 2, Ohio. Accumulated oil is drained frequently from coalescer 13 via valved drain line 14.

The substantially oil- and contaminants-free ethylene stream 16 passes thru a second pressure control station, comprising PIC 17 and motorized pressure let-down valve 18. Stream 19 exits valve 18 typically at 500 p.s.i.g., 80° F., and density of about 3.2 lb./ft$^3$. This ethylene stream is now suitable for passage to one or more polymerization reactor trains feed conduits 21a, b, or c, and the now substantially contaminants-free ethylene (or other olefin) stream passes directly to the polymerization zones as illustrated.

It will be necessary to determine the stream density which is "critical" to the operation of the invention. To operate according to the present invention it is necessary that the stream temperature and pressure are such that the stream density does not exceed 5.2 lbs. per cubic foot. Further, the temperature must be maintained above the saturation temperature of the olefin from which the oil is being separated, but not above 400° F.

Reasonable variation, modification, and alteration of the invention will become apparent from a study of the disclosure, the drawing, and the appended claims to those skilled in the art.

I claim:

1. A method of purifying a normally gaseous olefin stream of entrained oil and other catalyst poisons comprising:

(a) passing a high pressure olefin stream to be purified thru a pressure reduction means to bring the stream pressure down to a level suitable for charging to a reaction zone;

(b) heating the reduced pressure olefin stream, as required, to bring the stream temperature to a level suitable for charging to said zone; the resulting combination of pressure and temperature of said olefin stream being such that the olefin density is below 5.2 lbs./ft.$^3$ and said olefin is in the vapor phase, which permits the operation of subsequently described step (c);

(c) passing the processed olefin stream thru an oil separation means for substantially complete removal of entrained contaminants; and (d) passing the now substantially contaminants-free olefin stream directly to said reaction zone.

2. A method of purifying a normally gaseous ethylene stream of entrained oil and other catalyst poisons comprising:

(a) passing a high pressure ethylene stream to be purified thru a pressure reduction means to bring the stream pressure down to a level suitable for charging to a reaction zone;

(b) heating the reduced pressure ethylene stream to bring the stream temperature to a level suitable for charging to said polymerization zone; the resulting combination of pressure and temperature of said ethylene stream being such that the ethylene density is below 5.2 lbs./ft$^3$, which permits the operation of subsequently described step (c); and (c) passing the processed ethylene stream thru an oil separation means for substantially complete removal of entrained contaminants.

3. A method of purifying a normally gaseous ethylene stream of entrained oil and other catalyst poisons comprising:

(a) passing a high pressure ethylene stream to be purified thru a pressure reduction means to bring the stream pressure down to a level suitable for charging to a reaction zone;

(b) heating the reduced pressure ethylene stream to bring the stream temperature to a level suitable for charging to said polymerization zone; the resulting combination of pressure and temperature of said ethylene stream being such that the ethylene density is below 5.2 lbs./ft$^3$, which permits the operation of subsequently described step (c);

(c) passing the processed ethylene stream thru an oil separation means for substantially complete removal of entrained contaminants; and (d) passing the now substantially contaminants-free ethylene stream directly to said reaction zone.

4. A method of purifying a normally gaseous ethylene stream of entrained oil and other catalyst poisons comprising:

(a) raising a high pressure ethylene stream to be purified thru a pressure reduction means to bring the stream pressure down to a level in the range of 600 to 300 p.s.i.g. suitable for charging to a polymerization zone;

(b) heating the reduced pressure ethylene stream to bring the stream temperature to a level suitable for charging to said polymerization zone; the resulting combination of pressure and temperature of said ethylene stream being such that the ethylene density is below 5.2 lbs./ft.$^3$ which permits the operation of subsequently described step (c);

(c) passing the processed ethylene stream thru an oil separation means for substantially complete removal of entrained contaminants; and (d) passing the now substantially contaminants-free ethylene stream directly to said polymerization zone.

5. A method of purifying a normally gaseous ethylene stream of entrained oil and other catalyst poisons comprising:

(a) passing a high pressure ethylene stream to be purified thru a pressure reduction means to bring the stream pressure down to a level suitable for charging to a polymerization zone;

(b) heating the reduced pressure ethylene stream to bring the stream temperature to a level in the range of 90° F. to 400° F. suitable for charging to said polymerization zone; the resulting combination of pressure and temperature of said ethylene stream being such that the ethylene density is below about 4.5 lbs./ft.$^3$ which permits the operation of subsequently described step (c);

(c) passing the processed ethylene stream thru an oil separation means for substantially complete removal of entrained contaminants; and (d) passing the now substantially contaminants-free ethylene stream directly to said polymerization zone.

6. A method of purifying a normally gaseous ethylene stream of entrained oil and other catalyst poisons comprising:

(a) passing a high pressure ethylene stream to be purified from a storage source thru a pressure reduction means to bring the stream pressure down to a level in the range of 600 to 300 p.s.i.g. suitable for charging to a polymerization zone;

(b) heating the reduced pressure ethylene stream to bring the stream temperature to a level in the range of 90° F. to 400° F. suitable for charging to said polymerization zone; the resulting combination of pressure and temperature of said ethylene stream being such that the ethylene density is below about 4.5 lbs./ft.$^3$ which permits the operation of subsequently described step (c);

(c) passing the processed ethylene stream thru an oil separation means for substantially complete removal of entrained contaminants; and (d) passing the now substantially contaminants-free ethylene stream directly to said polymerization zone.

7. A method of purifying a normally gaseous ethylene stream of entrained oil and other catalyst poisons comprising:

(a) compressing a purified ethylene to high pressure;

(b) storing said compressed ethylene in an underground storage cavern under high pressure;

(c) passing a high pressure ethylene stream to be purified from a storage source thru a pressure reduction means to bring the stream pressure down to a level in the range of 600 to 300 p.s.i.g. suitable for charging to a polymerization zone;

(d) heating the reduced pressure ethylene stream to bring the stream temperature to a level in the range of 90° F. to 400° F. suitable for charging to said polymerization zone; the resulting combination of pressure and temperature of said ethylene stream being such that the ethylene density is below about 4.5 lbs./ft.$^3$ which permits the operation of subsequently described step (e);

(e) passing the processed ethylene stream thru an oil separation means for substantially complete removal of entrained contaminants; and (f) passing the now substantially contaminants-free ethylene stream directly to said polymerization zone.

References Cited

UNITED STATES PATENTS

| | | | |
|---|---|---|---|
| 2,381,198 | 8/1945 | Bailey et al. | 260—683.15 |
| 2,606,940 | 8/1952 | Bailey et al. | 260—683.15 |
| 2,691,647 | 10/1954 | Field et al. | 252—59 |
| 2,692,257 | 10/1954 | Zletz | 252—59 |
| 3,002,961 | 10/1961 | Kirschner | 260—99.4 |

DELBERT E. GANTZ, *Primary Examiner.*

ALPHONSO D. SULLIVAN, *Examiner.*